US010809786B2

(12) United States Patent
Chan et al.

(10) Patent No.: US 10,809,786 B2
(45) Date of Patent: Oct. 20, 2020

(54) METHODS AND SYSTEMS FOR MANAGING POWER SUPPLY TO A NETWORK DEVICE

(71) Applicant: Pismo Labs Technology Limited, Kowloon (HK)

(72) Inventors: Ho Ming Chan, Quarry Bay (HK); Nusrat Rahman, Dacca (BD)

(73) Assignee: Pismo Labs Technology Limited, Kowloon (HK)

( * ) Notice: Subject to any disclaimer, the term of this patent is extended or adjusted under 35 U.S.C. 154(b) by 189 days.

(21) Appl. No.: 15/766,352

(22) PCT Filed: Dec. 29, 2016

(86) PCT No.: PCT/IB2016/058073
§ 371 (c)(1),
(2) Date: Apr. 5, 2018

(87) PCT Pub. No.: WO2018/122576
PCT Pub. Date: Jul. 5, 2018

(65) Prior Publication Data
US 2019/0121410 A1 Apr. 25, 2019

(51) Int. Cl.
*G06F 15/16* (2006.01)
*G06F 1/26* (2006.01)
(Continued)

(52) U.S. Cl.
CPC ............ *G06F 1/266* (2013.01); *G06F 1/24* (2013.01); *G06F 9/4416* (2013.01); *H04L 12/12* (2013.01); *H04L 63/0407* (2013.01)

(58) Field of Classification Search
CPC ............ H04L 29/08072; H04L 29/06; H04L 63/0407; A63F 13/02
(Continued)

(56) References Cited

U.S. PATENT DOCUMENTS 7,823,196 B1 * 10/2010 Caldwell ............. H04L 63/0272
370/235
8,020,195 B2 * 9/2011 Frost .................. H04L 63/0407
709/227
(Continued)

FOREIGN PATENT DOCUMENTS

CN 101820359 A 9/2010
CN 103596246 A 2/2014

OTHER PUBLICATIONS

International Search Report in International Application No. PCT/IB2016/058073, dated Jun. 30, 2017.
(Continued)

*Primary Examiner* — Khanh Q Dinh
(74) *Attorney, Agent, or Firm* — FisherBroyles, LLP

(57) ABSTRACT

The present invention discloses a method carried out at a power controller for managing power supply to a network device, comprising the steps of sending a request message to a remote server, wherein the power controller is connected to the remote server via the network device and waiting for a valid response message from the remote server, wherein a valid response is received when all components of the network device are functioning properly. When a valid response message is not received from the remote server within a first predefined time, the network device is restarted. For the present invention the power controller connects to the remote server via the network device, wherein the network device connects to the remote server using at least one network interface. Furthermore, the request message is sent by the power controller via the network device if the network device is connected to the remote server via at least one network interface wherein the power controller has a data connection and a power connection with the network device.

20 Claims, 11 Drawing Sheets

(51) Int. Cl.
*H04L 12/12* (2006.01)
*H04L 29/06* (2006.01)
*G06F 1/24* (2006.01)
*G06F 9/4401* (2018.01)

(58) Field of Classification Search
USPC .................. 709/220, 224, 226, 228, 232
See application file for complete search history.

(56) References Cited

U.S. PATENT DOCUMENTS

| | | | |
|---|---|---|---|
| 2002/0091944 A1* | 7/2002 | Anderson | G06Q 10/06 709/223 |
| 2003/0120820 A1 | 6/2003 | Chen | |
| 2011/0183685 A1* | 7/2011 | Burton | H04W 12/0808 455/456.1 |
| 2012/0138677 A1* | 6/2012 | Ma | G07F 19/207 235/379 |
| 2012/0286770 A1* | 11/2012 | Schroder | H05B 37/0272 324/113 |
| 2014/0138434 A1* | 5/2014 | Toepke | G07F 19/207 235/379 |
| 2017/0171411 A1* | 6/2017 | Anezaki | H04N 1/00244 |
| 2017/0171412 A1* | 6/2017 | Masuda | H04N 1/00896 |
| 2018/0291911 A1* | 10/2018 | Ward | F04B 49/035 |
| 2019/0353156 A1* | 11/2019 | Ward | F04B 23/021 |

OTHER PUBLICATIONS

Written Opinion of the international Searching Authority in International Application No. PCT/IB2016/058073, dated Jun. 30, 2017.

* cited by examiner the present invention
METHODS AND SYSTEMS FOR MANAGING POWER SUPPLY TO A NETWORK DEVICE

TECHNICAL FIELD

The present invention relates in general to the field of network devices. More particularly, the present invention relates to a method carried out at a power controller for managing power supply to a network device.

BACKGROUND ART

Electronic devices comprising both hardware and software elements may sometimes not respond ideally to changes in network conditions, or changes in software or hardware configuration. This may happen due to a malfunction or bugs. Connections established at electronic devices with networking capabilities may become slow or may stop working due to various reasons. One of the reasons why connections may be broken is that Internet service providers (ISP) may change IP addresses often. This may cause the electronic device to attempt to connect to a wrong IP address or an expired IP address for establishing a connection. In such cases, restarting the electronic device is likely to fix the problem. However, in state of the art systems, restarting may require a user or administrator to be physically present in the vicinity of the electronic device if the device is not connected to any network. Therefore, methods and systems are required for automatically restarting devices when required.

SUMMARY OF INVENTION

The present invention discloses a method carried out at a power controller for managing power supply to a network device, comprising the steps of sending a request message to a remote server, wherein the power controller is connected to the remote server via the network device and waiting for a valid response message from the remote server, wherein a valid response is received when all components of the network device are functioning properly. When a valid response message is not received from the remote server within a first predefined time, the network device is restarted. For the present invention the power controller connects to the remote server via the network device, wherein the network device connects to the remote server using at least one network interface. Furthermore, the request message is sent by the power controller via the network device if the network device is connected to the remote server via at least one network interface wherein the power controller has a data connection and a power connection with the network device.

According to the present invention, a length of time that one or more components of the network device has been disconnected from the remote server or not functioning properly is determined. If it is seen that the length of time is longer than a second predefined time and a valid response message is not received from the remote server within the predefined time, the network device is restarted.

Furthermore, the power controller comprises a subscriber identity module (SIM) card slot housing a SIM card wherein the request message is sent using a cellular network, and not sent via the network device.

According to the embodiment of the present invention, the power controller supplies power to the network device using power over Ethernet (PoE).

In one variant of the present invention the power controller supplies power to the network device using an alternating current (AC) power outlet.

In one variant of the present invention, the power controller supplies power to the network device using a serial console or a universal serial bus (USB) port.

In one variant of the present invention, the power controller supplies power to a plurality of electronic devices.

In one variant of the present invention, one or more of the plurality of electronic devices are restarted based, at least in part, on a message from a management server. The message is received from the management server via the network device.

Furthermore, for the present embodiment, the message received from the management server is a short message service (SMS) message, wherein the message is received via a SIM card housed in a SIM card slot of the power controller.

DETAILED DESCRIPTION

Figure 1A:
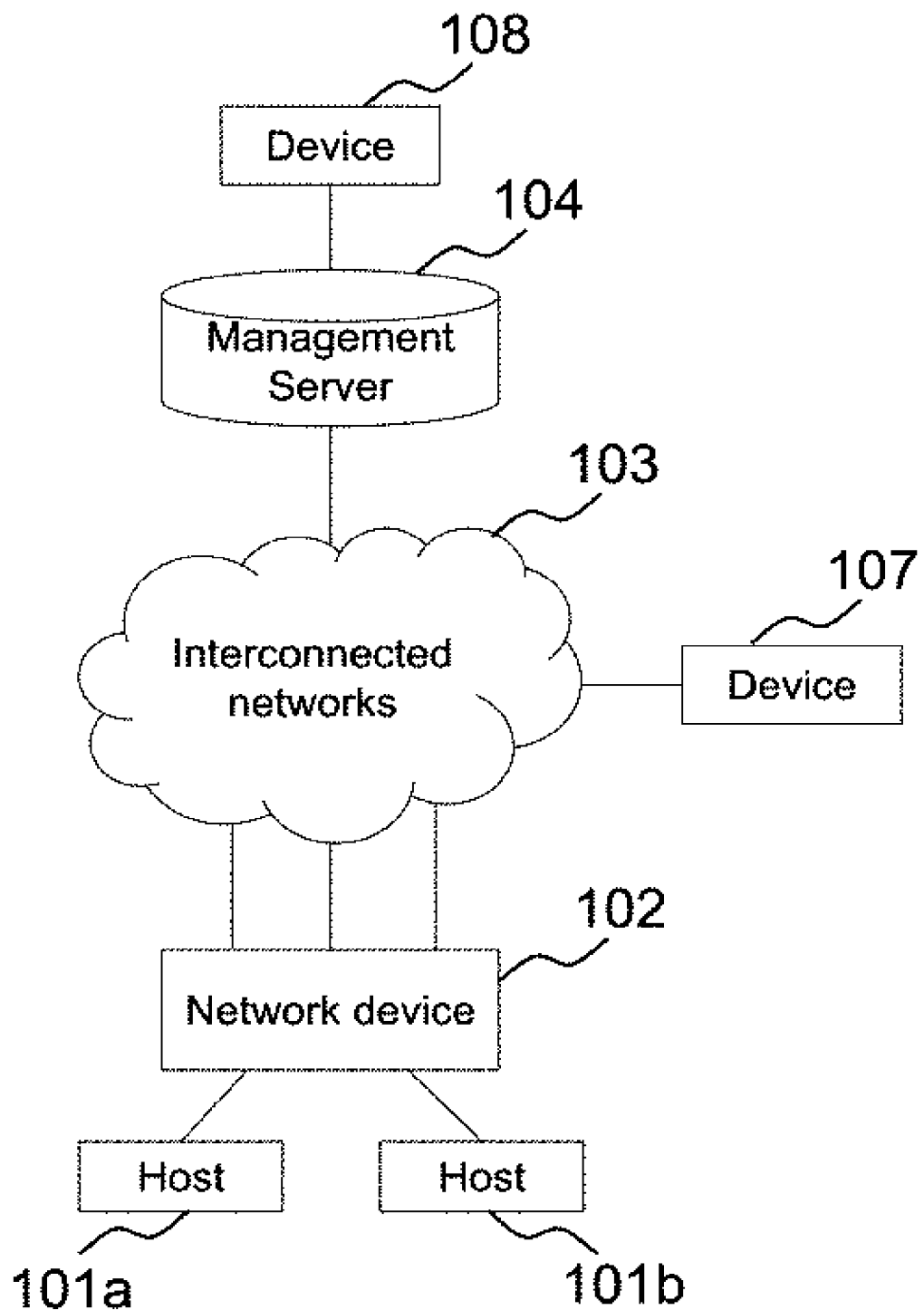
FIG. 1A is block diagram illustrating a network environment according to one of the embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization and can be a virtual machine readable medium including a virtual machine readable medium in a cloud-based instance.

The term "non-transitory computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fiber optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

FIG. 1A illustrates a network environment according to various embodiments of the present invention. Hosts 101a and 101b are connected to network device 102 through a wired or wireless local area network (LAN), or any other wired or wireless connection via technologies such as a universal serial bus (USB), Wi-Fi, Bluetooth, or serial console. Network device 102 connects to interconnected networks 103 through one or more of their Wide Area Network (WAN) interfaces. Management server 104 also connects to interconnected networks 103. A user or administrator may access management server 104 locally or remotely using a terminal such as device 107 or 108.

A management server, such as management server 104, is used to manage hosts or nodes remotely. Management server 104 is a router, a network node, a server, a desktop, a laptop, a mobile device or any electronic device that may store information related to a device and through which a device can be managed by a user or administrator. For example, management server 104 is used to manage network device 102, and/or hosts 101a and 101b, or any other electronic device that can be managed remotely. The administrator or user uses management server 104 to check the status of connections of network device 102, and to send instructions to network device 102. The user or administrator may enter the instructions at device 107 or 108 through a web interface, an API, a command line interface or a console. The user or administrator may need to manage more than one device including network device 102, and therefore it is beneficial to use management server 104, such that information related to all devices are stored and can be managed through management server 104. In one variant, the user or administrator uses device 107 to send instructions directly to network device 102 instead of sending the instruction to management server 104. Device 108 is in a same network as management server 104, i.e. device 108 may communicate with management server 104 directly via a wired or wireless connection. Device 107 may communicate with management server 104 via interconnected networks 103. Device 107 may be a laptop, a desktop, smartphone, a mobile device, or any electronic device that is capable of allowing the administrator or user to communicate information through interconnected networks 103. Similarly, device 108 may be a laptop, a desktop, smartphone, a mobile device, or any electronic device that is capable of allowing the administrator or user to communicate information to management server 104. For example, network device 102 houses a SIM card and is able to receive messages such as SMS messages, and device 107 is a mobile device. The user or administrator uses device 107 to send a message, such as an SMS message to network device 102. The message comprises one or more instructions.

Figure 2:
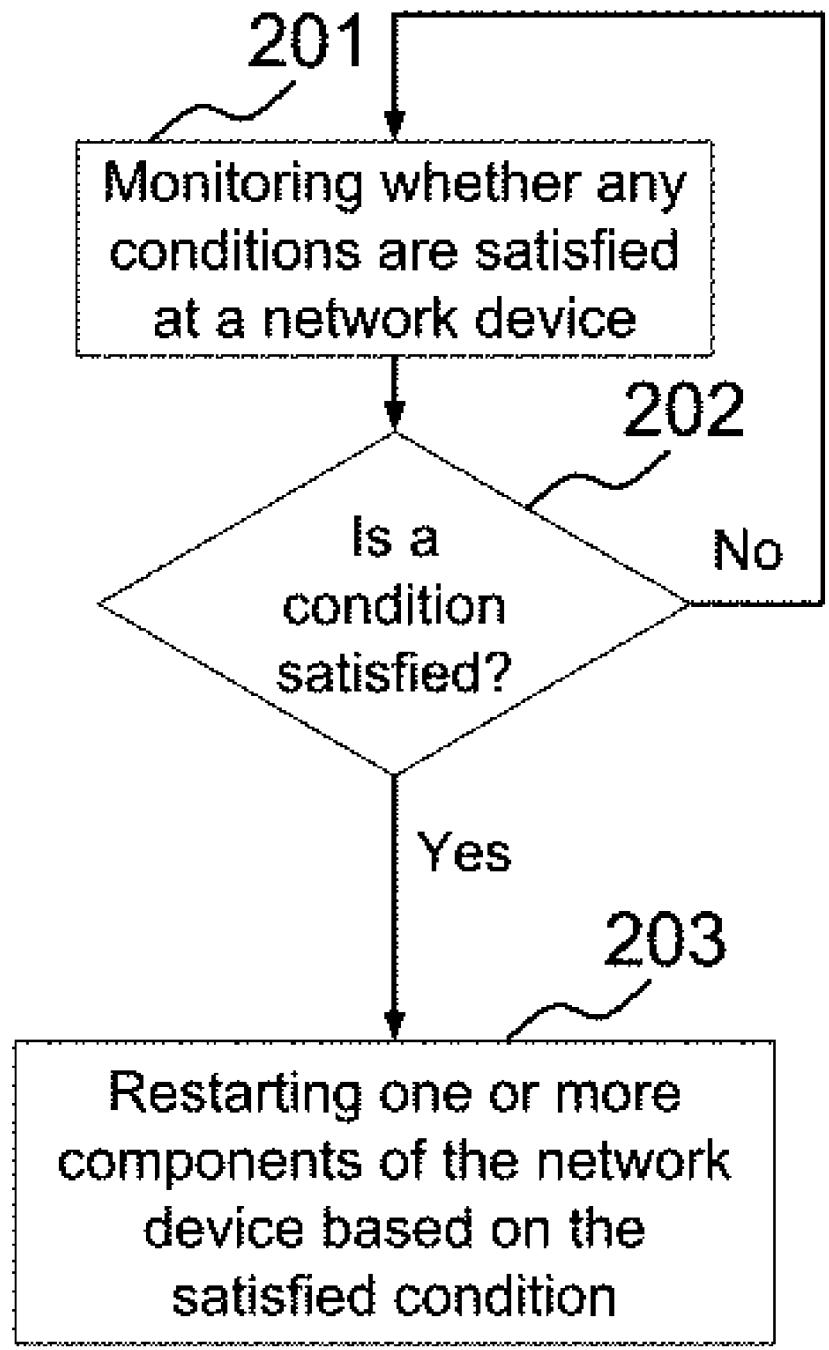
FIG. 2 is a flowchart illustrating a process according to one of the embodiments of the present invention.

FIG. 2 is a flowchart illustrating a process according to one of the embodiments of the present invention. A plurality of conditions is defined by an administrator for allowing network device 102 to determine whether one or more components of network device 102, or one or more devices connected to network device 102 are functioning properly. Components of network device 102 may include WAN interfaces, LAN interfaces, and main memory. In step 201, network device 102 monitors whether any of the plurality of conditions are satisfied. If network device 102 determines in step 202 that at least one condition is satisfied, one or more components of network device 102, or one or more devices connected to network device 102 are restarted in step 203.

According to one of the embodiments, only the components at which the at least one condition is satisfied are restarted. For example, when WAN interface 115 is not functioning properly, or has malfunctioned, only WAN interface 115 is restarted in step 203. One of the benefits of restarting only the component that has satisfied a condition is that the time required to restart is likely to be less, as the whole network device 102 is not restarted. The interruption in connectivity of network device 102 and devices depending on network device 102 is thus minimized.

For illustration purposes, restarting network interfaces includes disabling and enabling the network interfaces. For example, WAN interface 115 is an Ethernet WAN interface, and is named eth0 according to its configuration. It is known to those skilled in the art that the standard of naming Ethernet interfaces is eth0, eth1, eth2, and so on for a first Ethernet interface, second Ethernet interface, third Ethernet interface, and so on. A Linux command "ifdown eth0" is used for disabling WAN interface 115, and "ifup eth0" is used for enabling WAN interface 115. Using the two commands respectively, WAN interface 115 can be restarted.

In another embodiment, when one or more components of network device 102 satisfies a condition, all components of network device 102 are restarted, regardless of whether they satisfied the condition or not. Therefore, network device 102 is restarted. One of the benefits of restarting all components of network device 102 in step 203 is that when all components are restarted, it is likely that all components will start functioning correctly in coordination with each other.

For illustration purposes, a Linux command "ifdown –a" is used for disabling all network interfaces of network device 102 that are currently enabled, and "ifup –a" is used for enabling all network interfaces that are currently disabled. Therefore, all network interfaces are restarted. A Linux command "reboot" can used for restarting network device 102, i.e. all components of network device 102 are restarted.

According to one of the embodiments of the present invention, the steps of FIG. 2 are performed by an external power controller. Details of how a power controller is used for controlling power supply to network device 102 is described further in FIG. 1B and FIG. 6.

According to various embodiments of the present invention, the plurality of conditions is based on one or more of the following: connectivity, time, location, bandwidth, a policy, memory status, usage price, or processing unit load.

According to one of the embodiments, the condition is based on time. For example, if a condition for restarting is time, the restarting in step 203 is performed periodically, or at a predefined time. In one variant, each component of network device 102 is restarted one by one, i.e. all components are not restarted at the same time. For illustration purposes, WAN interfaces 115, 116, and 117 are each connected to a first, second and third network respectively. WAN interfaces 115, 116, and 117 are restarted one by one at step 203. More precisely, WAN interface 115 is first restarted, and when WAN interface 115 is functioning again, WAN interface 116 is restarted. Similarly, when WAN interface 116 is functioning again, WAN interface 117 is restarted. One of the benefits of restarting the components one by one is that network device 102 is connected to at least one network at a given time, and therefore has Internet connectivity through at least one WAN interface. In one variant, instead of only restarting WAN interfaces of network device 102, network device 102 is restarted altogether; i.e. all components such as WAN interfaces, processing unit 111, main memory 112, and secondary storage 114 are restarted. Restarting of a component is performed by stopping power supply to the component, and then again resuming power supply to the component. In one variant, only a specific component, such as WAN interface 115 is restarted at a given time. For example, a network that WAN interface 115 connects to is scheduled for maintenance from 04:00 am to 05:00 am every Saturday. Therefore, network device 102 restarts WAN interface 115 after 05:00 am every Saturday.

According to one of the embodiments, the condition is based on geographical location. For example, when network device 102 is moved from a first geographical location to a second geographical location, network device 102 restarts itself or one or more of its WAN interfaces. Geographical location of network device 102 is determined by processing unit 111 using a global positioning system (GPS) sensor. The GPS sensor is mounted within network device 102 or is externally attached to network device 102. The GPS sensor sends a trigger to processing unit 111 when there is a significant change in the geographical location of the router. In one variant, a motion sensor or motion detector is mounted in network device 102 or externally connected to network device 102. The motion sensor or motion detector sends a trigger to processing unit 111 when network device 102 moves more than a predefined distance. Processing unit 111 then restarts some or all components of network device 102 in step 203. One of the benefits of restarting network device 102 when its geographical location changes significantly is that network device 102 may connect to networks or base stations with better signals based on the new geographical location. For example, when network device 102 is restarted, it scans for new wireless networks to connect to. The wireless networks may be cellular networks or Wi-Fi networks.

According to one of the embodiments, the condition is based on performance of one or more WAN connections that network device 102 uses for connecting to interconnected networks 103. For example, a first connection is established between WAN interface 115 and a first network. If the performance of one or more connections deteriorates significantly, the condition is satisfied and step 203 is performed. In one variant, only WAN interface 115 is restarted, as the performance deterioration occurs at a connection of WAN interface 115. In another variant, all components of network device 102 are restarted. The benefits of restarting all components, or a specific component are described above. For example, when packet drop rate or packet loss rate of the first connection rises above a first predefined threshold, or bandwidth of the first connection falls below a second predefined threshold, or latency of the first connection rises above a third predefined threshold, step 203 is performed. This is discussed in further detail in FIG. 3.

According to one of the embodiments of the present invention, the condition is based on a policy. The policy is defined by a user or an administrator. For example, a policy is defined such that if no data has been received through any WAN interfaces for more than a predefined time period, network device 102 is restarted. For illustration purpose, if network device 102 has not received any data for a long time, it is likely that the connections of the network device 102 are down, or one or more components have malfunctioned. Therefore, it is beneficial to restart network device 102 in such cases, so that the connections are re-established.

In another example, a policy is defined such that when a message regarding a maintenance schedule is received from an ISP, network device 102 is restarted after the maintenance.

According to one of the embodiments of the present invention, the condition is based on status of main memory 112. For example, if it is determined that the amount of available memory less than a threshold, or there is a memory leak, the condition is satisfied and network device 102 is restarted in step 203.

According to one of the embodiments of the present invention, the condition is based on whether network device 102 is functioning normally. For example, if one or more functions of network device 102 are not producing correct or expected results, are not responding, or one or more modules of network device 102 are hung, the condition is satisfied and network device 102 is restarted in step 203.

According to one of the embodiments of the present invention, the condition is based on usage price. For example, when usage price of using a WAN connection established through WAN interface 116 exceeds a predefined threshold, WAN interface 116 is restarted. WAN interface 116 may be configured such that, whenever WAN interface 116 is restarted, a prepaid data plan is purchased in order to avoid paying per unit data pricing. It is common that per unit data pricing is higher than data pricing for a data plan. A data plan can be purchased by sending a predefined message to a carrier or ISP. The predefined message may be a SMS message, an email, a message on a web-page, a voice message, an instant message, or any other message that can be used for purchasing a data plan. The purchase may be billed to existing prepaid balance, postpaid balance, or any other electronic payment methods. In one variant, before purchasing the data plan, a message is sent to a user or administrator for confirmation, and the purchase is made after receiving a confirmation from the user or administrator.

According to one of the embodiments of the present invention, the condition is satisfied when a usage limit and/or a corresponding time limit for a data plan corresponding to a WAN connection is reached or is about to be reached. The usage limit and corresponding time limit is specified according to a data plan purchased from a carrier or service provider. Bandwidth throttling may occur when a usage limit is reached. In some scenarios, even if it is time to reset a usage limit, or when a payment has been made by a user or administrator for resetting the usage limit, the usage limit may not be reset automatically. When the usage limit is reached or is about to be reached, the condition is satisfied, and network device 102 is restarted. When network device 102 is restarted, it is likely that the usage is reset. For example, the time limit of a prepaid data plan of a WAN connection is one month, and the usage limit is 10 GB. When the time limit is over, the pre-paid data plan should be purchased again, even if there's remaining usage limit. When the prepaid data plan is purchased again, the usage limit is reset to 10 GB. In one variant, if the remaining usage limit is 1 GB, the usage limit is reset to 11 GB by accumulating 1 GB and 11 GB. If it is determined that the data plan has been purchased, but the usage limit has not been reset, the network device 102 is restarted, and the usage limit is then reset.

According to one of the embodiments of the present invention, the condition is based on processing unit load. For example, when the processing unit load of network device 102 is determined to be higher than a predefined threshold, the condition is satisfied and one or more components of network device 102 are restarted. When processing unit load is high, network device 102 may malfunction or some functions may not work properly as expected. In order to avoid malfunctioning and a memory leak, network device 102 is restarted if processing unit load becomes higher than a predefined threshold.

According to one of the embodiments of the present invention, the when the condition is satisfied in step 202, drivers of one or more connected modems are reinstalled in step 203. For example, a USB 4G modem is connected to USB port 140, where the USB LTE modem allows WAN interface 115 to connect to a 4G network. When a condition is satisfied, drivers for the USB LTE modem are reinstalled, in case there is a malfunction.

The drivers are downloaded from management server 104. Alternatively, the drivers are downloaded from another server accessible through interconnected networks 103. Alternatively, the drivers are stored in secondary storage 114, and are retrieved from secondary storage 114 during installation.

Figure 5:
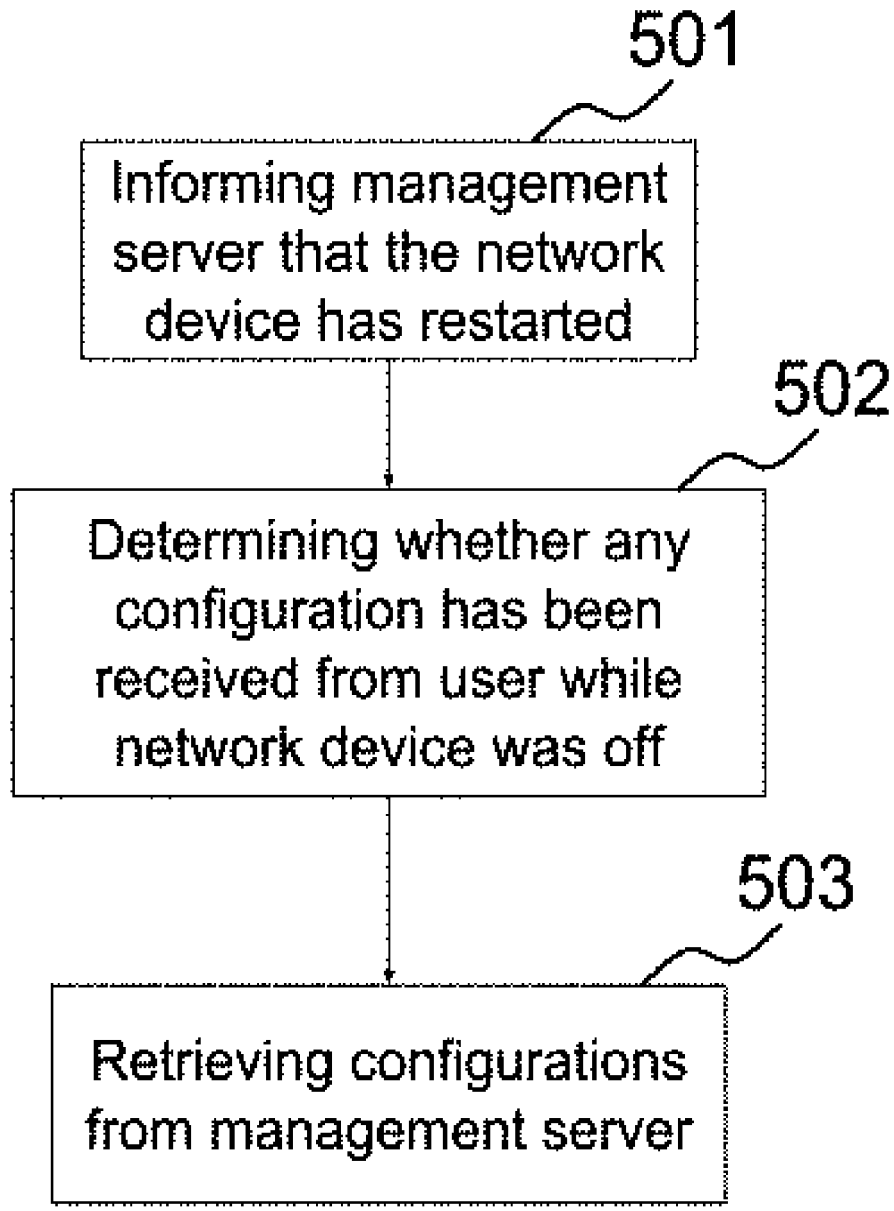
FIG. 5 is a flowchart illustrating a process performed after restarting network device 102 according to one of the embodiments of the present invention.

According to one of the embodiments of the present invention, after one or more components of network device 102 are restarted in step 203, processing unit 111 resets configurations of network device 102 as before. For example, if there were any VPN connections established through any of the WAN interfaces, the VPN connections are re-established after restarting. FIG. 5 is a flowchart illustrating a process performed after restarting network device 102 according to one of the embodiments of the present invention. In step 501, network device 102 informs management server 104 that network device 102 has been restarted and is on again. In step 502, network device 102 determines whether any configuration has been received from a user or administrator at management server 104 while network device 102 was off. As discussed above, management server 104 is used by a user or administrator to manage or configure network device 102. If a configuration for network device 102 is received by management server 104, it stores the configuration, and waits until network device 102 is turned on for sending the configuration to network device 102. Therefore, when network device 102 has restarted, it retrieves the configurations, if any, from management server 104 in step 503. Network device 102 is then configured with the configurations.

According to one of the embodiments of the present invention, when a condition is satisfied in step 202, instead of restarting one or more components of network device 102, all settings of network device 102 are reset, and any user logging in to network device 102 or hosts 101a or 101b are logged off. This is beneficial as it ensures additional security of the network device 102. For example, when a condition is based on location, and there is a significant change in the geographical location of network device 102, VPN connections of network device 102 are disconnected, and hosts 101a, 101b or any other devices connecting to network device 102 are prompted for authentication again for having access to network device 102.

Figure 3:
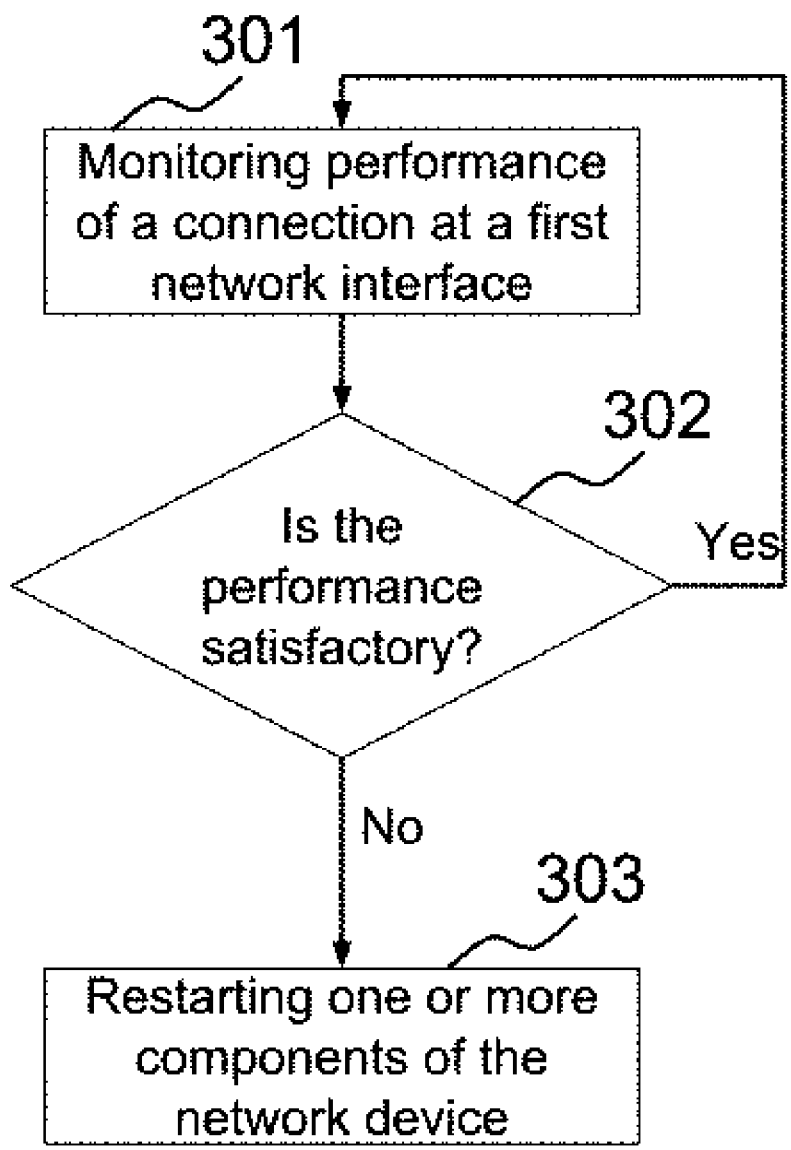
FIG. 3 is a flowchart illustrating a process when the condition is based on the performance according to one of the embodiments of the present invention.

FIG. 3 is a flowchart illustrating a process when the condition is based on the performance according to one of the embodiments of the present invention. In step 301, network device 102 monitors performance of WAN connections established through its WAN interfaces, such as WAN interface 115. In step 302, if the performance of a WAN connection established through WAN interface 115 is not satisfactory, WAN interface 115 is restarted in step 303. The performance monitored may include one or more of throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

For example, in step 302, it is determined that latency of a connection established through WAN interface 115 increases more than a predefined threshold, it is likely that the connection is down. WAN interface 115 is then restarted in step 303. When WAN interface 115 is restarted, the connection is established again, and it is likely that the latency is lower than predefined threshold when the connection is established again. For example, a wireless cellular connection can be established using WAN interface 115. WAN interface 115 establishes the wireless cellular connection with an available base station. In one variant, when WAN interface 115 is restarted in step 303, network device 102 scans for other base stations to connect to using WAN interface 115. One of the benefits of scanning for other base stations is that the connection established with another base station may have lower latency than the previous connection.

In another example, in step 302, it is determined that a signal-to-noise ratio (SNR) margin at a WAN interface, such as WAN interface 116, is lower than a predefined threshold. The SNR margin is the difference between current SNR and the SNR that's required to serve a particular speed. When SNR margin is lower than expected, it is likely that there is a problem in the physical connection established through WAN interface 116. WAN interface 116 is therefore restarted in step 303. Drivers for establishing a connection at WAN interface 116 are reinstalled. In one variant, when the connection is a wired connection, a message is sent to the user or administrator with an instruction to replace the modem and/or the wire.

In one variant, in step 302, network device 102 further monitors status of end-to-end connections, such as virtual private network (VPN) connections established through WAN interfaces 115-117. If any end-to-end connections are down or broken, network device 102 restarts one or more components in step 303. When WAN interfaces 115-117 are restarted, or network device 102 is restarted, network device 102 may try to establish VPN connections again. VPN connections may be established according to VPN profiles configured by a user or administrator. When the VPN connections are established again, network device 102 may avoid establishing a connection using a WAN connection that has a deteriorating performance.

Figure 1B:
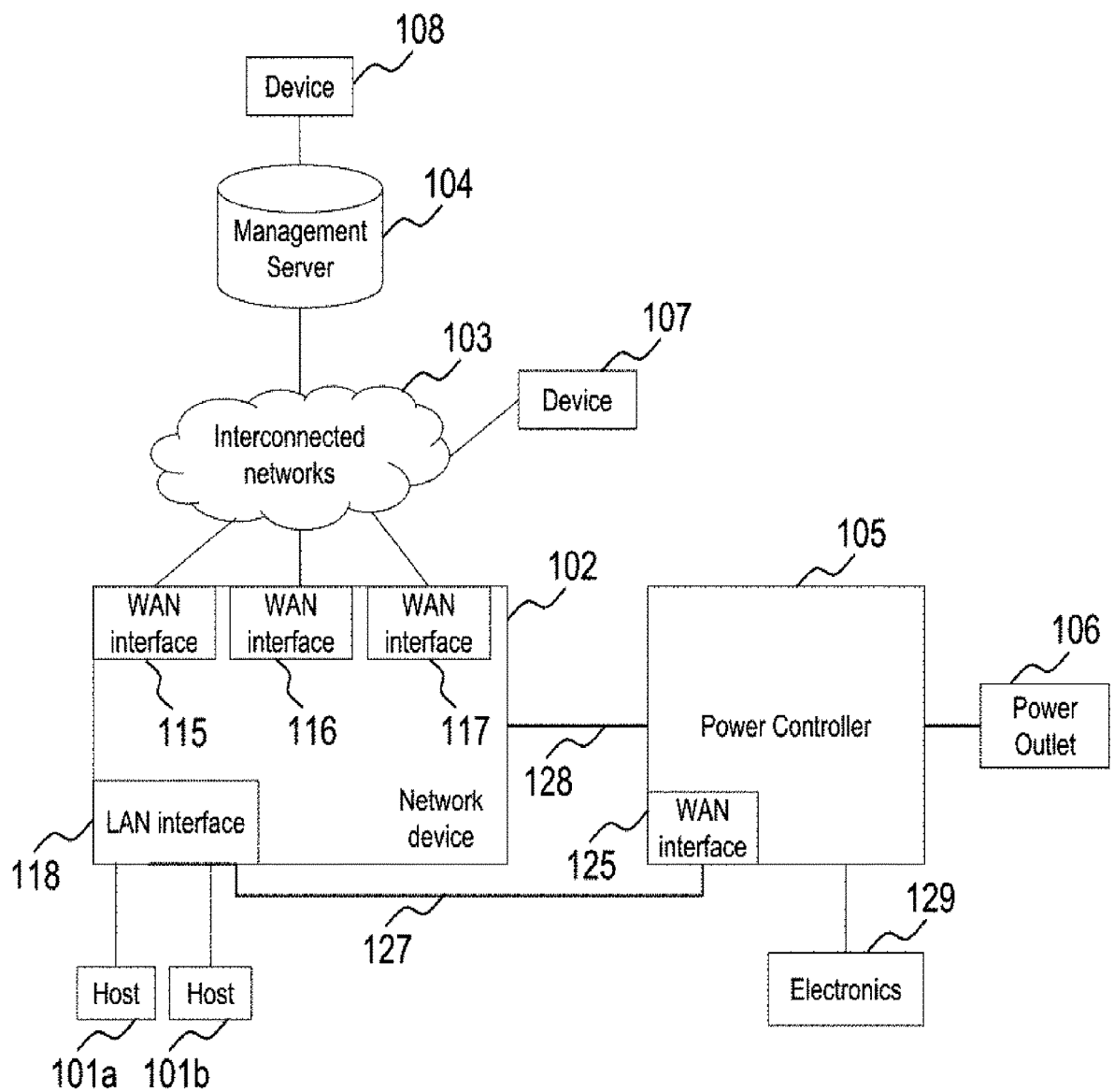
FIG. 1B is a block diagram illustrating a network environment according to one of the embodiments of the present invention.

FIG. 1B is a block diagram illustrating a network environment according to one of the embodiments of the present invention. Steps of FIG. 2A are performed by power controller 105, such that power controller 105 controls power supply to network device 102. Power controller 105 is optionally also used for controlling power supply to electronics 129. Power supply to network device 102 and electronics 129 are not dependent on each other, such that power controller may supply power to one or more of network device 102 and electronics 129 and may also supply different levels of power to network device 102 and electronics 129. Power controller 105 may have one or more power outlets for supplying power to network device 102 and electronics 129. Each power outlet is used for supplying power to a single device, or a plurality of devices among network device 102 and electronics 129. One of the reasons for using power controller 105 for controlling power supply is so that the user or administrator can restart or switch off devices remotely based on various conditions or status of network environments. In some scenarios, such as when network device 102 is disconnected from interconnected networks 103, or has a software or hardware malfunction, it may not be feasible to manage or restart network device 102 remotely. Therefore, in these scenarios, power controller 105 can be used to control power supply to network device 102. Furthermore, electronics 129 may not have the functionality to be managed remotely, and thus a user or administrator may control power supply to electronics 129 using power controller 105.

Electronics 129 may comprise various electronic devices such as a television, IP phone, computer, refrigerator, etc. Power controller 105 comprises at least one WAN interface, such as WAN interface 125. WAN interface 125 may be a wired or wireless network interface through which power controller 105 connects to one or more networks. Network device 102 comprises at least one WAN interface and at least one LAN interface. For illustration purpose, network device 102 comprises WAN interfaces 115, 116 and 117, and LAN interface 118. WAN interfaces 115, 116 and 117, and LAN interface 118 are a wired or wireless interface. Host 101*a*, host 101*b* and power controller 105 are connected to network device 102 via LAN interface 118. Power controller 105 is connected to power outlet 106, which supplies power to power controller 105 from the mains electricity. Power controller 105 establishes a data connection with network device 102 via WAN interface 125 and LAN interface 118 respectively. Power controller 105 is capable of accessing interconnected networks 103 via network device 102. Connection 127 is a data connection between power controller 105 and network device 102. Power controller 105 supplies power to network device 102 via a power connection provided by power cable 128. Power cable 128 is plugged in a terminal block of network device 102, or any port that can be used for receiving power from power controller 105, such as a USB port or an alternating current (AC) port. Network device 102 is connected to interconnected networks 103 via one or more WAN connections established through one or more WAN interfaces 115, 116, and 117.

For example, LAN interface 118 is a wireless LAN (WLAN) interface and provides a Wi-Fi network. Hosts 101*a*, 101*b*, and power controller 105 connect to the Wi-Fi network and are able to access interconnected networks 103 via network device 102. Power controller 105 communicates with management server 104 via network device 102 and interconnected networks 103.

In one variant, network device 102 comprises a plurality of LAN interfaces, and hosts 101*a*, 101*b*. Power controller 105 may connect to same or different LAN interfaces of network device 102. For example, LAN interface 118 is a wireless LAN interface, and a second LAN interface of network device 102 is an Ethernet interface. WAN interface 125 of power controller 105 is an Ethernet interface, and power controller 105 connects to network device 102 via an Ethernet connection between WAN interface 125 and the second LAN interface. In one example, power controller 105 and network device 102 have Power over Ethernet (PoE) functionality. Power controller 105 acts as a power sourcing equipment (PSE) and network device 102 acts as a powered device (PD), and the Ethernet connection is used as both a data connection and a power connection between power controller 105 and network device 102. In this scenario, power cable 128 is optional, and is not needed for supplying power from power controller 105 to network device 102.

In one variant, power controller 105 connects to interconnected networks 103 using WAN interface 125 without connecting to network device 102. One of the benefits of power controller 105 having Internet connectivity not via network device 102 is that if WAN connections established by network device 102 to interconnected networks 103 fail or are disconnected, power controller 105 may still be connected to interconnected networks 103, and therefore to management server 104. Management server 104 is therefore able to send instructions to power controller 105 for stopping or resuming power supply to network device 102. For example, a USB modem is inserted in WAN interface 125 and power controller 105 can access interconnected networks 103 via the USB modem. Alternatively, an Ethernet connection from an ISP is established via WAN interface 125. A user or administrator can send instructions to power controller 105 through interconnected networks 103 using a terminal, such as device 108 or device 107.

If a user or administrator wishes to restart network device 102 and/or one or more electronics 129 from a remote location, the user or administrator sends an instruction to power controller 105 for restarting the one or more electronics 129. Power controller 105 then stops supplying power to network device 102 and/or the one or more connected electronics 129, and then again resumes supplying power to network device 102 and/or the one or more connected electronics 129. In another example, the user or administrator sends an instruction to turn off one or more connected electronics 129, and power controller 105 then stops supplying power to the one or more connected electronics 129.

According to one of the embodiments, power controller 105 comprises a SIM card slot, and a SIM card is housed in the SIM card slot. Power controller 105 is therefore capable of sending and receiving SMS messages. For example, when power controller 105 determines network device 102 is disconnected from interconnected networks 103, and power controller 105 is unable to send messages to the user or administrator through network device 102, power controller 105 sends a SMS message to the user or administrator before restarting network device 102. The user or administrator can also send an instruction in a SMS message to power controller 105 to restart one or more devices, such as network device 102 or electronics 129.

For example, a user or administrator may send an instruction to network device 102 using a short message service (SMS) message. The SMS message can be sent by the user or administrator to a number associated with the SIM card housed in power controller 105. When power controller 105 connects to interconnected networks 103 via network device 102, Internet connectivity of power controller 105 depends on status of WAN connections of network device 102 and may sometimes be down due to changes in network conditions. In such cases, it is beneficial for the user or administrator communicate with power controller 105 via a SMS message. The SMS message contains a predefined content, such that when the SMS message is processed, power controller 105 determines that network device 102 or one or more electronics 129 should be restarted. The predefined content may comprise a secret code for authenticating the sender of the SMS message.

According to one of the embodiments, power controller 105 can connect to interconnected networks 103 using a cellular connection to have a temporary Internet connectivity. When network device 102 has been restarted, and power controller 105 is able to connect to interconnected networks 103 via network device 102, power controller 105 stops using the cellular connection and starts using WAN interface 125 to connect to network device 102 for Internet connectivity. Power controller 105 uses the cellular connection temporarily because it is likely that usage price of a cellular connection is higher than that of Wi-Fi or Ethernet. One of the benefits of disconnecting from the cellular connection as soon as Internet connection is available through network device 102 is that usage cost for using the cellular connection is likely to be reduced, and overall cost is lower compared to using the cellular connection by default.

Figure 6:
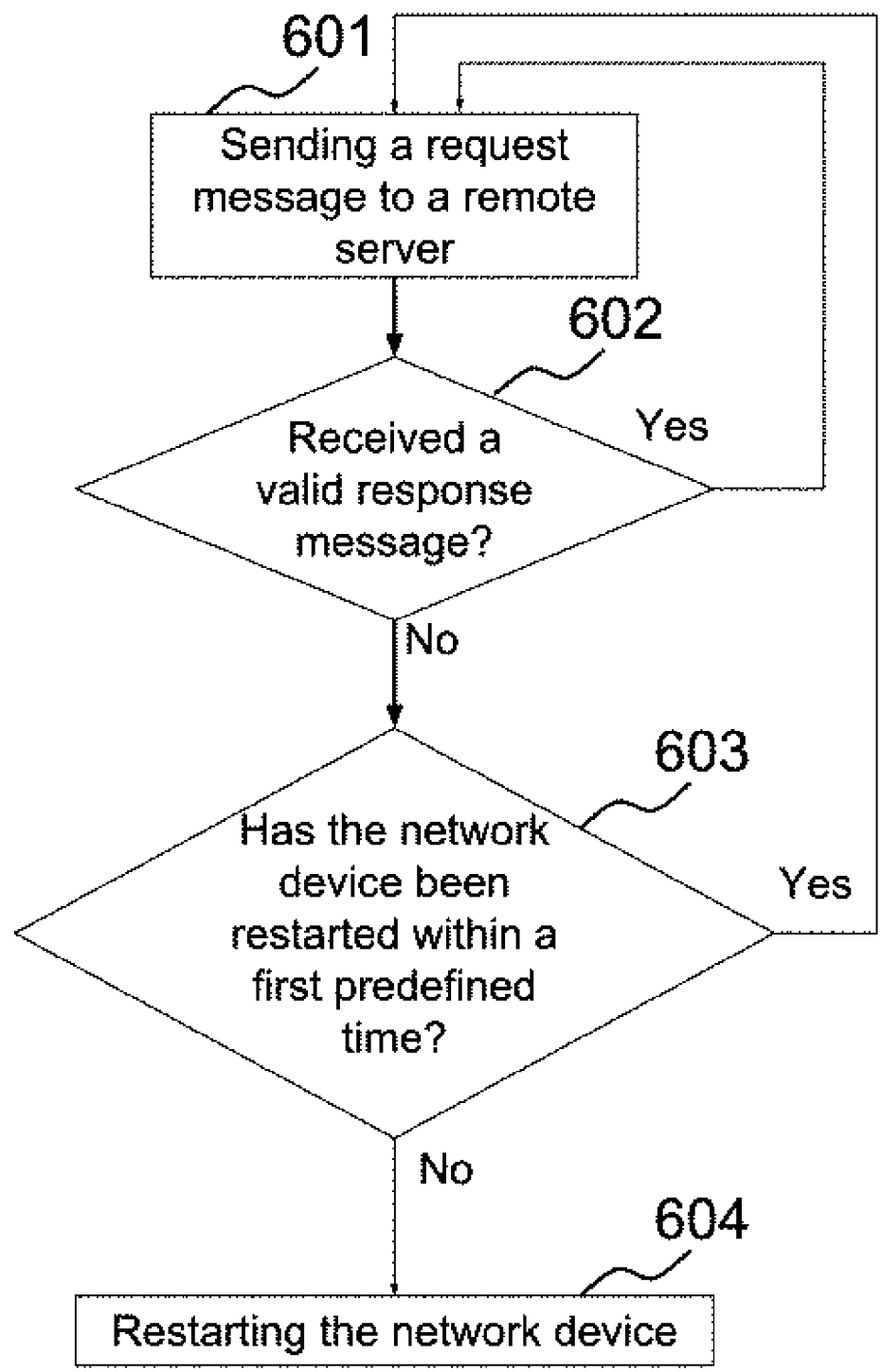
FIG. 6 is a flowchart illustrating a process according to one of the embodiments of the present invention.

FIG. 6 is a flowchart illustrating a process according to one of the embodiments of the present invention. FIG. 6 is viewed in conjunction with FIG. 1B for better understanding of the embodiments. The process of FIG. 6 is performed by power controller 105 to determine whether one or more WAN connections of network device 102 are connected, and whether they can be used for successfully sending and receiving data. In step 601, power controller 105 sends a request message to a remote server, such as management server 104, via network device 102. Power controller 105 uses WAN interface 125 to send the request message to network device 102, where the destination address of the request message is an IP address of management server 104. Network device 102 then attempts to forward the request message to management server 104 via one or more of WAN interfaces 115-117. In step 602, power controller 105 determines whether a valid response message has been received from management server 104. If a valid response message has been received, power controller 105 determines that the one or more WAN connections of network device 102 are functioning properly and network device 102 is connected to interconnected networks 103 using at least one of WAN interfaces 115-117. If a valid response message is not received within a first predefined time, power controller 105 determines that there is a problem in one or more WAN connections established through WAN interfaces 115-117, or one or more components of network device 102 have malfunctioned, which causes data to not be transmitted or received successfully through WAN interfaces 115-117. As discussed above, restarting network device 102 may allow network device 102 to be able to transmit or receive data successfully. In step 603, power controller 105 determines whether network device 102 has been restarted within a second predefined time. If the network device has not been restarted within the second predefined time, power controller 105 restarts network device 102 in step 604. Power controller 105 restarts network device 102 by temporarily stopping power supply to network device 102 through the power connection. For illustration purpose, the request message is sent for the purpose of conducting a health-check. The health-check can be performed using Ping, DNS (Domain Name Server) lookup, Hypertext Transfer Protocol (HTTP) or any other protocol that can be used to send the request message and receive a response message. If the health check is performed using Ping, the request message comprises Internet Control Message Protocol (ICMP) packets. The response message is a DNS response comprising DNS resource records, or an acknowledgement message (ACK). One of the benefits of performing step 603 is to ensure that network device 102 is not restarted very often. It is known that restarting a device may require significant amount of time, and hence it may be preferred to not restart network device 102 often. Furthermore, restarting network device 102 too often may result in software or hardware malfunction.

According to one of the embodiments, before performing step 604, power controller 105 determines the length of time WAN connections through one or more WAN interfaces 115-117 have been disconnected or not functioning properly. Network device 102 is restarted only if the WAN connection has not been functioning for more than a third predefined time. This is also done in order to avoid restarting network device 102 too often.

For illustration purposes, the first predefined time is within the range of five to ten milliseconds, the second predefined time is within the range of five to ten minutes, and the third predefined time is within the range of one to ten minutes.

Figure 1C:
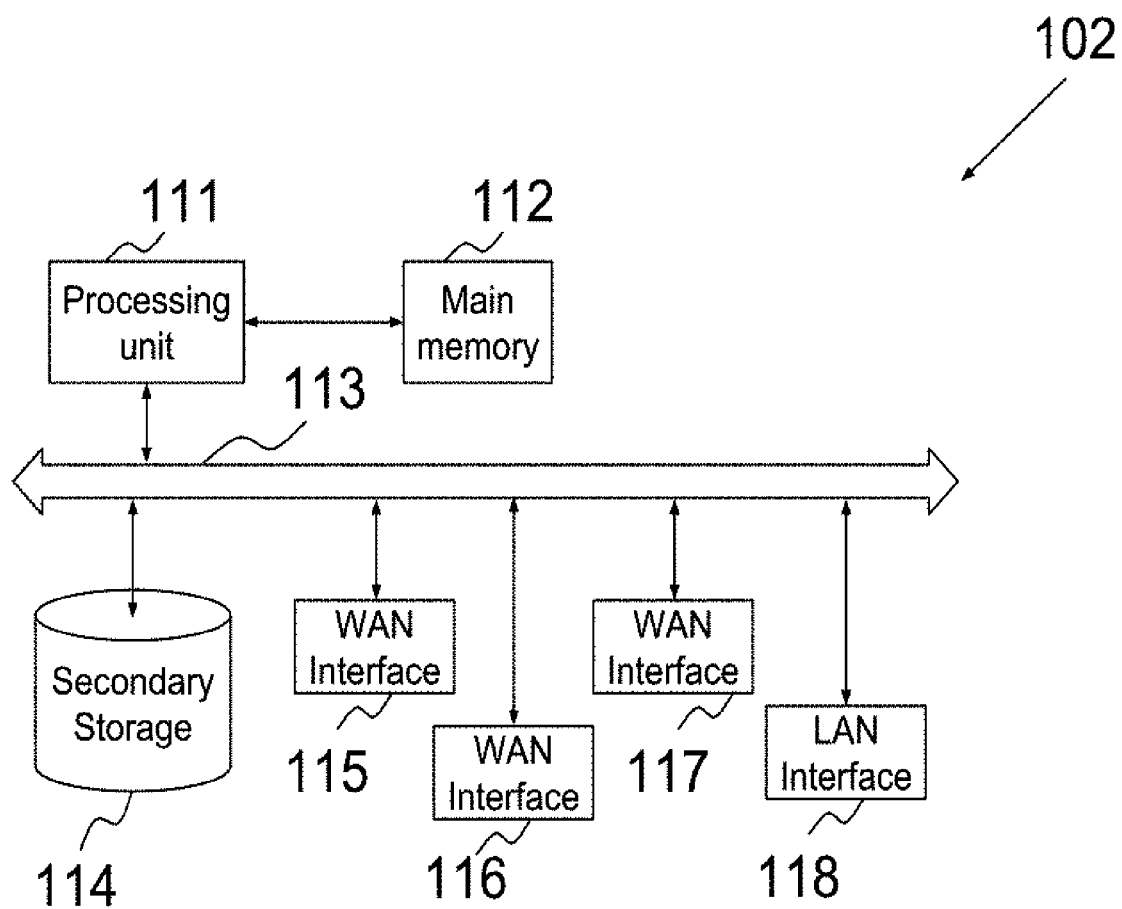
FIG. 1C is a block diagram illustrating a system architecture of network device 102.

FIG. 1C is a block diagram illustrating a system architecture of a device, such as network device 102. Network device 102 comprises processing unit 111, main memory 112, secondary storage 114, system bus 113, WAN interfaces 115-117, and LAN interface 118. Secondary storage 114 is a non-transitory computer readable storage medium. Processing unit 111 and main memory 112 are connected to each other directly. System bus 113 connects processing unit 111 directly or indirectly to secondary storage 114, WAN interfaces 115-117, and at least one LAN interface 118. Using system bus 113 allows the device to have increased modularity. System bus 113 couples processing unit 111 to secondary storage 114, WAN interfaces 115-117, and LAN interface 118. System bus 113 can be any of several types of bus structures including a memory bus, a peripheral bus, and a local bus using any of a variety of bus architectures. Secondary storage 114 stores program instructions for execution by processing unit 111. The methods described in the embodiments below are processes at network device 102 carried out by processing unit 111.

Figure 1D:
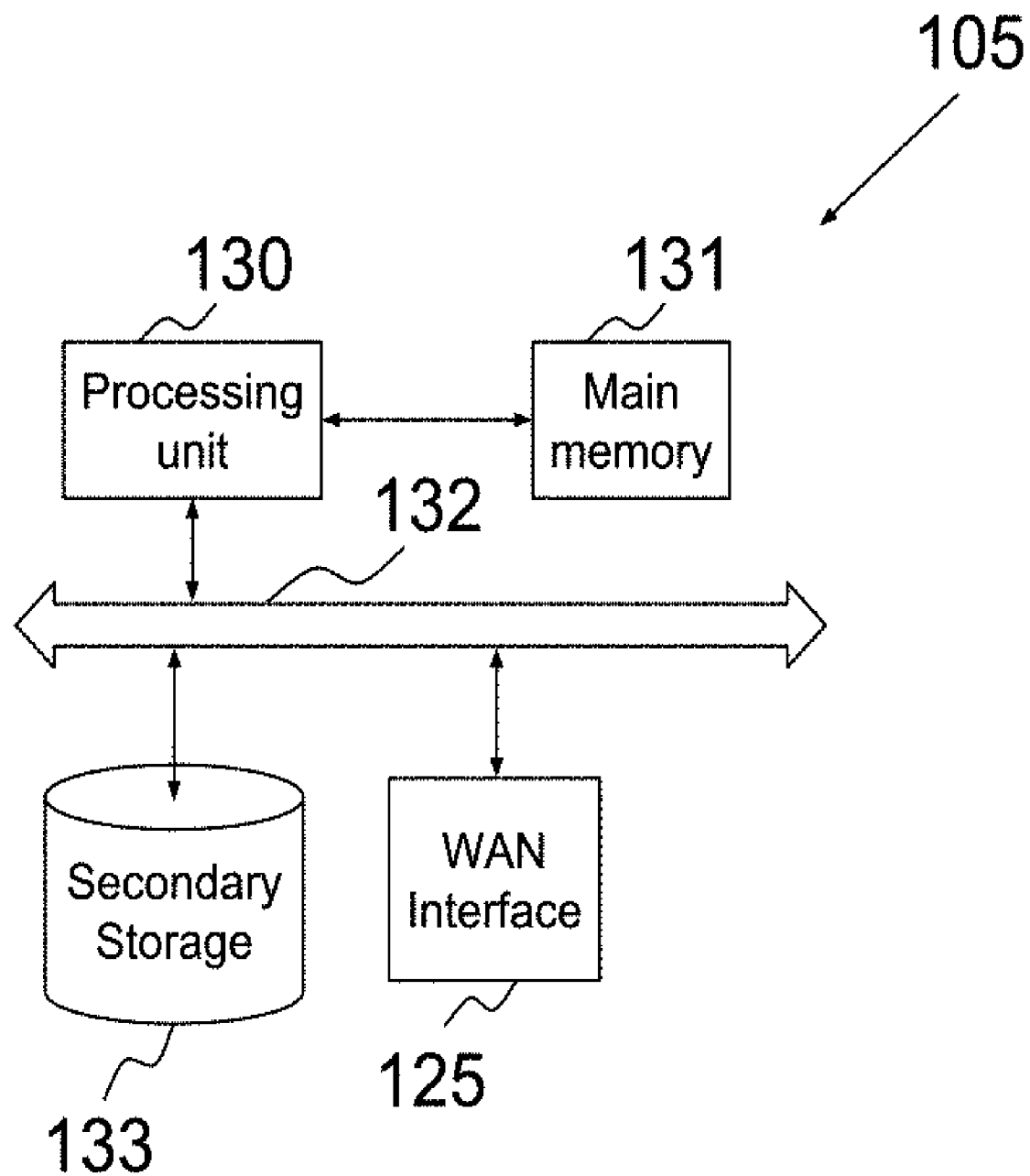
FIG. 1D is a block diagram illustrating a system architecture of power controller 105.

FIG. 1D is a block diagram illustrating a system architecture of a device, such as power controller 105. Power controller 105 comprises processing unit 130, main memory 131, secondary storage 133, system bus 132, and WAN interface 125. Secondary storage 133 is a non-transitory computer readable storage medium. Processing unit 130 and main memory 131 are connected to each other directly. System bus 132 connects processing unit 130 directly or indirectly to secondary storage 133, and WAN interface 125. Using system bus 132 allows the device to have increased modularity. System bus 132 couples processing unit 130 to secondary storage 133, WAN interface 125. System bus 132 can be any of several types of bus structures including a memory bus, a peripheral bus, and a local bus using any of a variety of bus architectures. Secondary storage 133 stores program instructions for execution by processing unit 130. Some of the methods described in the embodiments below are processes at power controller 105 carried out by processing unit 130.

Figure 1E:
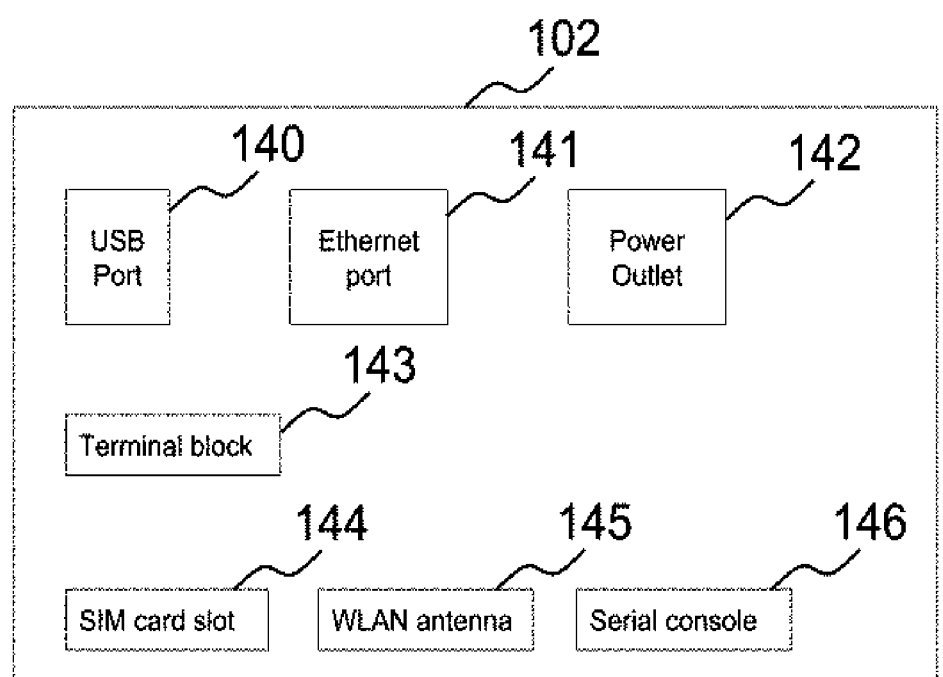
FIG. 1E is a block diagram illustrating the external components of network device 102 according to one of the embodiments of the present invention.

FIG. 1E is a block diagram illustrating the external components of network device 102 according to one of the embodiments of the present invention. Network device 102 comprises USB port 140, Ethernet port 141, power outlet 142, terminal block 143, SIM card slot 144, WLAN antenna 145 and serial console 146. It should be noted that network device 102 may comprise one or more of each of USB port 140, Ethernet port 141, power outlet 142, terminal block 143, SIM card slot 144, WLAN antenna 145 and serial console 146. USB port 140 is used as a WAN interface. A USB modem inserted in USB port 140 can be used for establishing a WAN connection. Alternatively, USB port 140 can also be used to connect to other devices such as mobile phones or USB powered devices. Ethernet port 141 is a WAN interface which can be used for establishing a WAN connection. Network device 102 may optionally comprise another Ethernet port which is a LAN interface used for connecting to a host in a LAN. Power outlet 142 is used for supplying power to one or more electronic devices. In one example, power outlet 142 may be an Ethernet interface capable of providing PoE, as discussed above. In another example, terminal block 143 is used for receiving power from mains electricity or a power controller, such as power controller 105. SIM card slot 144 is a WAN interface used for housing a SIM card. The SIM card allows network device 102 to send or receive SMS messages and may also provide Internet connectivity. WLAN antenna 145 allows hosts to connect to a WLAN provided by network device 102. For example, the WLAN is a Wi-Fi network. Serial console 146 can also be used by hosts to connect to network device 102.

In one variant, one or more of USB port 140, Ethernet port 141, power outlet 142, terminal block 143, SIM card slot 144, WLAN antenna 145 and serial console 146 may be omitted, such that network device 102 may function without one or more of these components.

According to one of the embodiments of the present invention, as illustrated in FIG. 1E, network device 102 comprises a SIM card slot 144 which houses a SIM card. A user or administrator may send an instruction to network device 102 using a short message service (SMS) message. The SMS message is sent to a number associated with the SIM card housed in network device 102. Internet connectivity of network device 102 may sometimes be down due to changes in network conditions. In such cases, it is beneficial to send instructions to network device 102 via a SMS message. The SMS message contains a predefined content, such that when the SMS message is processed, network device 102 determines that one or more components should be restarted. The predefined content may comprise a secret code for authenticating the sender of the SMS message.

According to one of the embodiments of the present invention, network device 102 acts both as a power controller and as a router. As illustrated in FIG. 1E, network device 102 comprises a power outlet 142 through which network device 102 supplies power to one or more devices, such as hosts 101a and 101b, or electronics 129. For example, power outlet 142 is an Ethernet interface, and network device 102 provides power to other devices, such as hosts 101a and 101b using Power over Ethernet (PoE). Network device 102 therefore acts as a power sourcing equipment (PSE) for hosts 101a and 101b. In one example, when a condition is satisfied in step 202, network device 102 restarts hosts 101a and/or 101b in step 203 but does not restart any of the components of network device 102. More precisely, network device 102 temporarily stops supplying power to hosts 101a and/or 101b. For example, power supply is stopped for five seconds and then resumed again. For illustration purposes, a command "poe poe-shutdown" disables power to a port. The command "poe poe-shutdown" is used for stopping power supply through power outlet 142, and network device 102 thus stops supplying Power over Ethernet via power outlet 142. A command "no poe-shutdown" enables power to a port. The command "no poe-shutdown" is used for resuming power supply through power outlet 142.

According to one of the embodiments, power outlet 142 is an alternating current (AC) power outlet. Network device 102 is capable of supplying power to one or more electronic devices such as electronics 129 or hosts 101a and 101b. Network device 102 is connected to and receives power from mains electricity via terminal block 143. Network device 102 may comprise a plurality of power outlets, such that each electronic device from electronics 129 or hosts 101a and 101b is connected to network device 102 using a different power outlet. This allows network device 102 to control power supply to each of electronic devices individually according to instructions received from the user or administrator. For example, a television is connected to a first power outlet of network device 102 and a computer is connected to a second power outlet of network device 102. Network device 102 has internet connectivity through one or more of WAN interfaces 115-117, and/or a cellular connection provided by a SIM card. Alternatively, network device 102 is capable of receiving SMS messages through a SIM card. If the user or administrator wishes to turn off the television, the user or administrator sends an instruction to network device 102 via interconnected networks 103 or using a SMS message. When network device 102 receives the instruction, network device 102 stops supplying power to the television through the first power outlet.

According to one of the embodiments, network device 102 is connected to one or more devices through USB port 140. USB port 140 may act as a WAN interface. For example, a USB modem can be inserted in USB port 140, and it may provide Internet connectivity to network device 102. Alternatively, a mobile phone can be connected to network device 102 using a USB cable inserted in USB port 140, and a data connection of a SIM card inserted in the mobile phone may be tethered using the USB connection. If the USB modem is not functioning properly, or performance of the Internet connection via the USB modem is not satisfactory, network device 102 may restart the USB modem by stopping power supply to USB port 140, and again resuming power supply to USB port 140. In another example, a USB-powered device may be plugged in USB port 140. Network device 102 may restart the USB-powered device if an instruction is received from a user or administrator. For illustration purpose, the following Linux commands is used for stopping and resuming power supply to USB port 140 respectively, where USB port 140 is named "usb1":

"echo suspend>/sys/bus/usb/devices/usb1/power/level"
"echo on>/sys/bus/usb/devices/usb1/power/level"

Figure 4A:
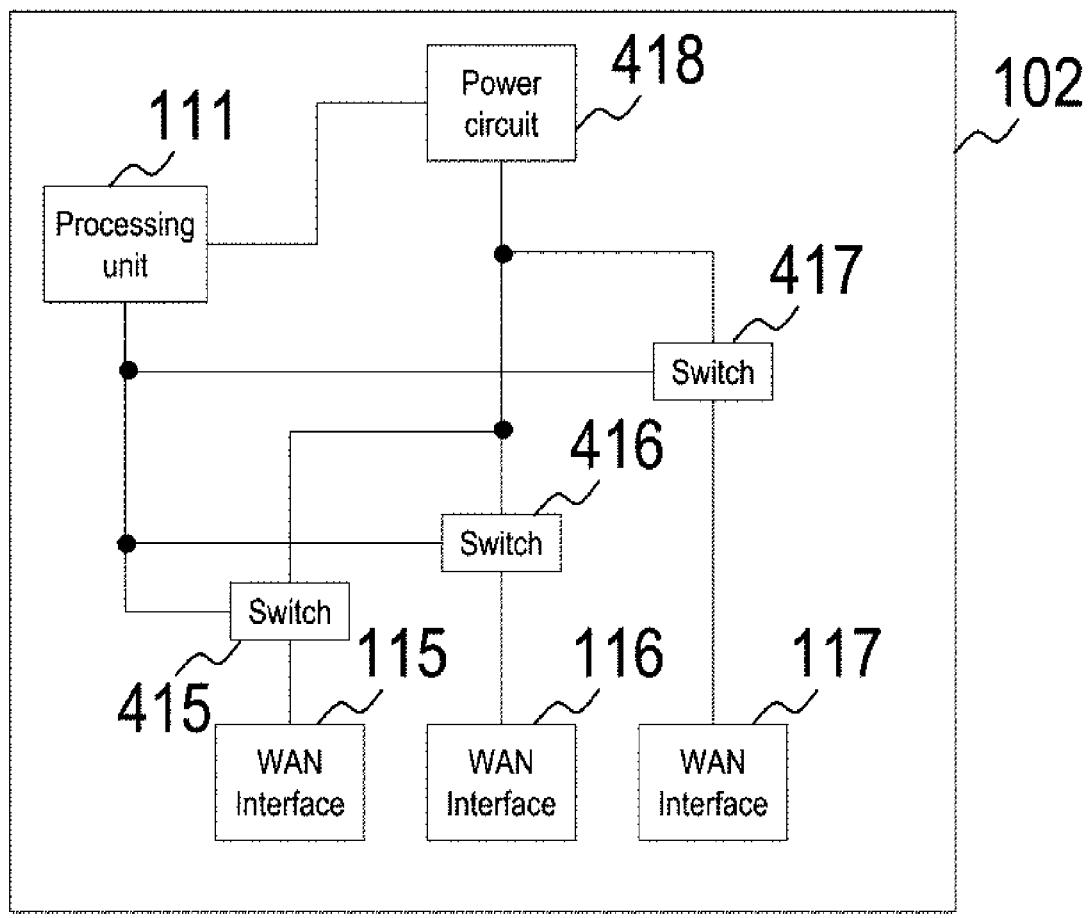
FIG. 4A illustrates a block diagram of network device 102 according to one of the embodiments of the present invention

FIG. 4A illustrates a block diagram of network device 102 according to one of the embodiments of the present invention. Each component of network device 102, such as WAN interfaces 115-117 is connected to a power circuit via a switch. For example, WAN interface 115 is connected to power circuit 418 through switch 415, WAN interface 116 is connected to power circuit 418 through switch 416, and WAN interface 117 is connected to power circuit 418 through switch 417. Switches 415, 416, and 417 are field-effect transistors (FET), bipolar transistors, bipolar junction transistor (BJT) insulated-gate bipolar transistor (IGBT), metal-oxide-semiconductor FET (MOSFET), metal-semiconductor FET (MESFET), junction FET (JFET), carbon nanotube FET (CNTFET), high-electron-mobility transistor (HEMT), heterostructure insulated gate FET (HIGFET), modulation-doped FET (MODFET), nanoparticle organic memory FET (NOMFET), organic FET (OFET), vertical-slit FET (VeSFET), tunnel FET (TFET), relay, or any other type of switches that can be controlled by processing unit 111. Switches 415, 416, and 417 receive an input signal from processing unit 111, and based on the input signal, power is supplied from power circuit 418 to WAN interfaces 115, 116, and 117 respectively.

Figure 4B:
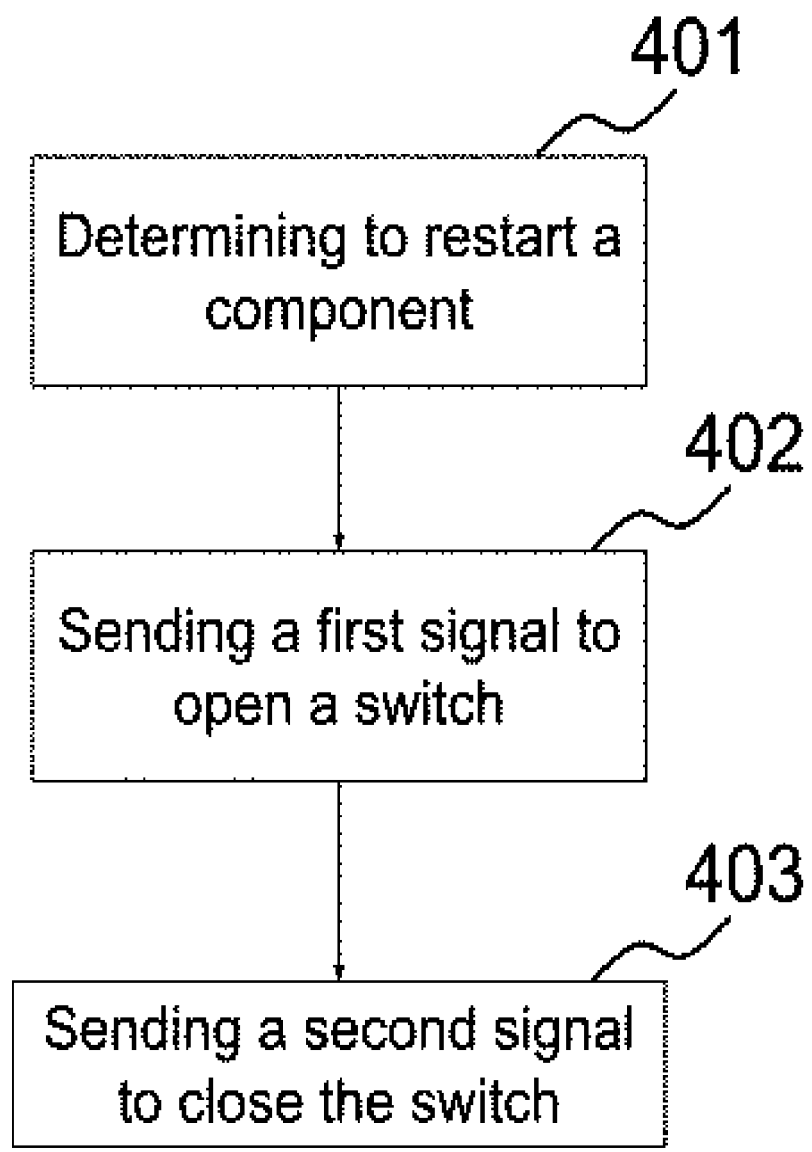
FIG. 4B is a flowchart illustrating a restart process for performing step 203 of FIG. 2 according to one of the embodiments of the present invention.

FIG. 4B is a flowchart illustrating a restart process for performing step 203 of FIG. 2 according to one of the embodiments of the present invention. In step 401, network device 102 determines to restart a first component, such as WAN interface 115. In step 402, a first signal is sent to switch 415 by processing unit 111, which causes switch 415 to open. Therefore, when switch 415 is open, power supply to WAN interface 115 is stopped. In step 403, processing unit 111 sends a second signal to close switch 415, and thus power supply to WAN interface 115 is resumed. In this way, WAN interface 115 is restarted. The function of power circuit 418 is to supply power to processing unit 111, and the rest of the components of network device 102.

According to one of the embodiments, before network device 102 is restarted, a notification is sent to a user or administrator. The notification is sent to a device, such as devices 107 or 108, used by the user or administrator via email, SMS message, instant message (IM), pop-up message, or any other message that can be used to inform a user that network device 102 is about to be restarted. In one variant, after sending the notification and before restarting one or more components of network device 102, network device 102 waits for a confirmation from a user or administrator. After a confirmation is received from the user or administrator, one or more components of network device 102 are restarted. If no confirmation is received from the user or administrator, components of network device 102 are not restarted.

In one variant, if network device 102 is unable to send a notification to a user or administrator before restarting, the notification is sent after restarting. Network device 102 could be unable to send the notification to the user or administrator due to connectivity problems. For example, if network device 102 is connected to interconnected networks 103 using only one WAN interface, such as WAN interface 115 and a WAN connection established through WAN interface 115 is disconnected, network device 102 is unable to send the notification to the user before restarting.

The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method carried out at a power controller for managing power supply to a network device, comprising the steps of:
   (a) sending a request message to a remote server when the power controller is supplying power to the network device; wherein the power controller is connected to the remote server via the network device;
   (b) waiting for a valid response message from the remote server; wherein the valid response message is received when all components of the network device functioning properly; and
   (c) when a valid response message is not received from the remote server within a first predefined time, stopping providing electricity to the networking device temporary, and then resuming providing electricity to restarting the network device;
   wherein:
   the power controller connects to the remote server via the network device;
   the network device connects to the remote server using at least one network interface;
   the request message is sent by the power controller via the network device if the network device is connected to the remote server via the at least one network interface;
   the power controller has at least one data connection and at least one power connection with the network device; and
   the power controller and the network device are two different separate devices.

2. The method of claim 1, further comprising determining a length of time that one or more components of the network device has been disconnected from the remote server or not functioning properly; wherein step (c) is performed if the length of time is longer than a second predefined time.

3. The method of claim 1, wherein:
   the power controller comprises a subscriber identity module (SIM) card slot housing a SIM card; and
   the request message and the valid response message are sent and received using a cellular network connected using the SIM card without passing through the network device.

4. The method of claim 1, wherein the power controller supplies power to the network device using power over Ethernet (PoE).

5. The method of claim 1, wherein the power controller supplies power to the network device using an alternating current (AC) power outlet.

6. The method of claim 1, wherein the power controller supplies power to the network device using a serial console or a universal serial bus (USB) port.

7. The method of claim 1, wherein the power controller supplies power to a plurality of electronic devices.

8. The method of claim 7, further comprising: restarting one or more of the plurality of electronic devices based, at least in part, on a message from a management server.

9. The method of claim 8, wherein the message is received from the management server via the network device.

10. The method of claim 8, wherein:
    the message received from the management server is a short message service (SMS) message, and
    the message is received via a SIM card housed in a SIM card slot of the power controller.

11. A system, comprising:
a power controller configured to manage power supply to a network device, wherein the power controller comprises:
   at least one network interface;
   at least one processing unit; and
   at least one non-transitory computer readable storage medium storing program instructions executable by the at least one processing unit and configured to cause the at least one processing unit to:
   (a) send a request message to a remote server when the power controller is supplying power to the network device; wherein the power controller is connected to the remote server via the network device;
   (b) wait for a valid response message from the remote server; wherein the valid response message is received when all components of the network device are functioning properly;
   (c) when a valid response message is not received from the remote server within a first predefined time, stop providing electricity to the networking device temporary, and then resume providing electricity to the network device;
   wherein:
      the power controller connects to the remote server via the network device;
      the network device connects to the remote server using at least one network interface;
      the request message is sent by the power controller via the network device if the network device is connected to the remote server via the at least one network interface;
      the power controller has at least one data connection and at least one power connection with the network device; and
      the power controller and the network device are two different separate devices.

12. The system of claim 11, wherein the at least one non-transitory computer readable storage medium further stores program instructions executable by the at least one processing unit and configured to cause the at least one processing unit to determine a length of time that one or more components of the network device has been disconnected from the remote server or not functioning properly; wherein step (c) is performed if the length of time is longer than a second predefined time.

13. The system of claim 11, wherein:
the power controller comprises a subscriber identity module (SIM) card slot housing a SIM card; and
the request message and the valid response message are sent and received using a cellular network connected using the SIM card, without passing through the network device.

14. The system of claim 11, wherein the power controller supplies power to the network device using power over Ethernet (PoE).

15. The system of claim 11, wherein the power controller supplies power to the network device using an alternating current (AC) power outlet.

16. The system of claim 11, wherein the power controller supplies power to the network device using a serial console or a universal serial bus (USB) port.

17. The system of claim 11, wherein the power controller supplies power to a plurality of electronic devices.

18. The system of claim 17, wherein the at least one non-transitory computer readable storage medium further stores program instructions executable by the at least one processing unit and configured to cause the at least one processing unit to restart one or more of the plurality of electronic devices based, at least in part, on a message from a management server.

19. The system of claim 18, wherein the message is received from the management server via the network device.

20. The system of claim 18, wherein:
the message received from the management server is a short message service (SMS) message, and
the message is received via a SIM card housed in a SIM card slot of the power controller.

* * * * *